April 20, 1965  A. SAVITZKY  3,179,798
SAMPLE CELL FOR LIVE ZERO SPECTROMETER
Filed Sept. 22, 1961

INVENTOR.
Abraham Savitzky
BY
ATTORNEY.

United States Patent Office 3,179,798
Patented Apr. 20, 1965

3,179,798
SAMPLE CELL FOR LIVE ZERO SPECTROMETER
Abraham Savitzky, Norwalk, Conn., assignor to The Perkin-Elmer Corporation, Norwalk, Conn., a corporation of New York
Filed Sept. 22, 1961, Ser. No. 140,124
2 Claims. (Cl. 250—43.5)

This invention relates to spectrometry, and more particularly, to improved sample cells therefor.

In spectrometric analysis, a beam of radiant energy is passed through a sample area to a suitable monochromator where the radiation is scanned through its various wavelengths. The sample located in the sample area may then be identified by analyzing its absorption of the various wavelengths of the spectrum. Such spectrometers may utilize infrared, visible, or ultraviolet radiation. Furthermore, they may be either of the single beam type wherein the total radiation is passed through the sample or they may be of the double beam type wherein a reference beam is employed to cancel out the various discrepancies which may exist due to source brightness fluctuations, atmospheric absorption, etc. The output of the spectrometer is customarily provided by the signal from a suitable radiation detector which is amplified and recorded. In quantitative analysis, it is desirable that the zero point—in other words, that point at which no transmission by the sample takes place—be set as accurately as possible. This is a particular problem in optical null instruments. In such instruments, a suitable radiation attenuator is inserted into the reference beam and may be servo-controlled with the recorder pen. As the absorption taking place in the sample beam increases, the attenuator is operated to reduce the reference beam by a corresponding amount. A suitable chopper is provided which causes the detector to alternately receive sample and reference radiation. It will be apparent, therefore, that as the transmission of the sample approaches zero, more and more attenuation of the reference beam will be required. It thus becomes very difficult to set zero exactly, as all energy is then removed from the reference beam.

It is, therefore, a primary object of the present invention to provide an improved sample cell for spectrometric analyses.

It is another object of this invention to provide a spectrophotometer wherein zero may be set more accurately than in previous instruments.

It is another object of this invention to provide such a cell wherein a live zero may be obtained.

The manner in which the above objects are achieved will be more apparent from the following description, the appended claims, and the figures of the attached drawing wherein:

Figure 1:
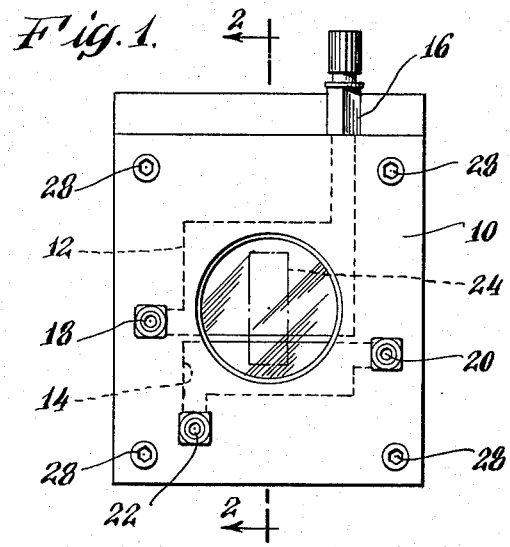
FIG. 1 is an illustration of a cell adapted for use with fluid samples.

The objects of this invention are achieved by providing a sample holder for a spectrophotometric analyzer which defines at least two beam transmitting portions. The holder is adapted to support a sample in one of the portions and the other portion remains substantially free of sample. The construction of a sample holder manufactured in accordance with this invention will be more apparent from FIG. 1 wherein the cell will be seen to include two separate chambers 12 and 14. Chamber 12 includes filling holes 16 and 18, and is used to contain the sample undergoing tests. The second chamber 14 includes filling holes 20 and 22 and contains a solvent. The mechanical structure of the specific embodiment illustrated will be seen to comprise a front plate 10 and a back plate 26, each with a central opening for the passage of radiation. Plates 10 and 26 are clamped together by means of screws 28 to retain suitable windows 30 separated by the cell gasket 32 which defines chambers 12 and 14. The holder is positioned in the instrument with the sample beam falling on both portions of the cell as illustrated by the dashed line 24. The ratio of solvent area to sample area is not critical. A suitable ratio would be approximately five (5%) percent.

Figure 3:
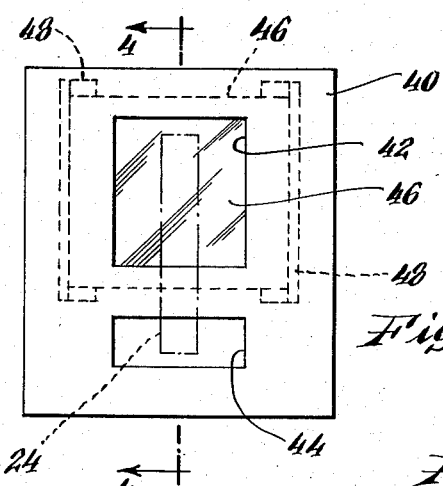
FIG. 3 is an illustration of a cell adapted for use with solid samples.
Figure 4:
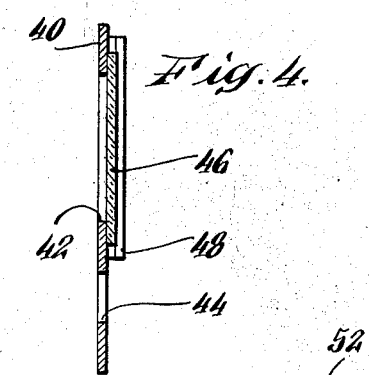
FIG. 4 is a cross section taken along lines 4—4 of FIG. 3.

A variation of this cell adapted for use with polymer film work is shown in FIGS. 3 and 4 wherein an opaque mask 40 contains two openings 42 and 44 which lie in the sample beam. The polymer film 46 under test is positioned under the larger opening by a suitable holder 48 while the other opening is retained as an air gap. Dashed line 24 indicates the boundaries of the impinging radiation.

Figure 2:
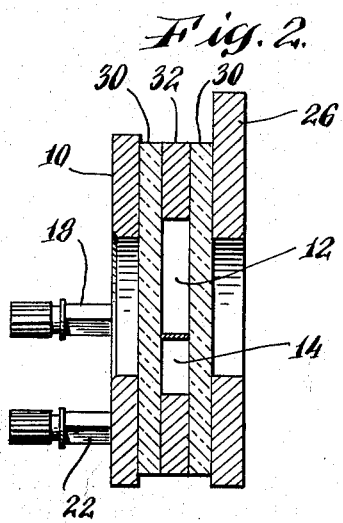
FIG. 2 is a cross section taken along line 2—2 of FIG. 1.

The operation of the invention as illustrated in FIGS. 1 and 2 would involve the introduction into chamber 14 of a solvent used in preparation of the sample. The sample dissolved in the solvent is introduced into chamber 12. The cell would then be introduced into the instrument and the instrument zero would be set by blocking the light from entering chamber 12 without blocking chamber 14. This, of course, would mean that the reference beam attenuator would be almost completely inserted into the reference beam, thus providing a "live zero" adjustable either up or down scale. Once the zero had been set, light is permitted to pass through chamber 12.

By a very similar procedure, the holder shown in FIGS. 3 and 4 would be inserted into the sample beam of an instrument with a polymer film. The energy is then blocked from entering opening 42 and the zero of the instrument would then be set.

Figure 6:
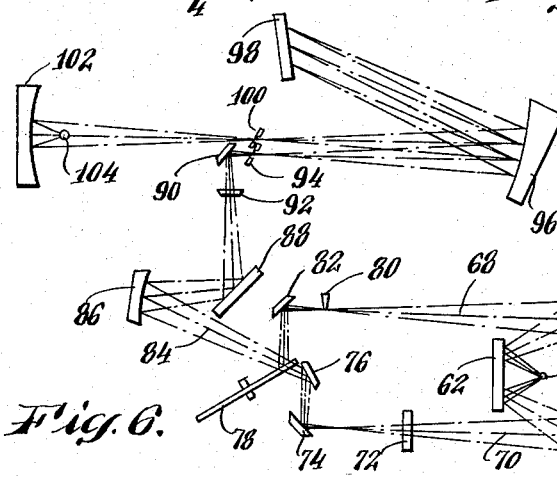
FIG. 6 illustrates a spectrophotometer embodying the invention.

In FIG. 6 there is illustrated a well known type of double-beam spectrophotometer utilizing the invention. A radiation source 60 emits radiation, such as infrared radiation which is reflected from a plane mirror 62 and focused by toroidal mirrors 64, 66 into a reference beam 68 and a sample beam 70. The sample beam passes through a cell 72, of the type illustrated in FIG. 1, for example, and is directed by plane mirrors 74, 76 to a semicircular chopper 78 of well known design. A nulling wedge 80 is movably positioned in reference beam 68 to act as a variable attenuator thereof, and this beam is similarly directed to chopper 78 by plane mirror 82. As chopper 78 rotates, it alternately directs sample and reference radiation into a combined beam 84 which is refocused by toroidal mirror 86 and directed by plane mirrors 88 and 90 through a filter 92 and a monochromator entrance slit 94. From the entrance slit the radiation is collimated by paraboloidal mirror 96 and dispersed into its component wavelengths by reflectance grating 98. The dispersed radiation passes through exit slit 100 and is focused by ellipsoidal mirror 102 onto a suitable radiation detector 104.

Figure 5:
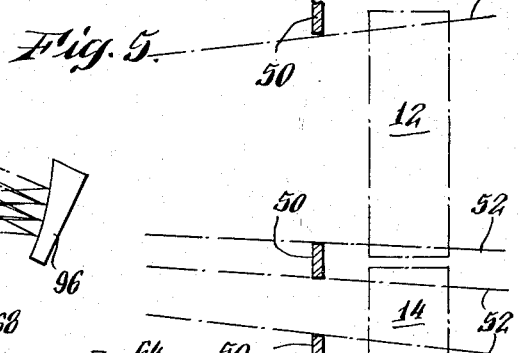
FIG. 5 illustrates a modification of the invention.

It is to be understood that the mask defining the two portions of the beam need not be a part of the sample holder. In fact, it may often be desirable to place the mask physically distant from the sample, for example, by positioning it on the cell holder. This arrangement is illustrated in FIG. 5 wherein mask 50 defines the extremities 52 of the radiation passing through the chambers 12 and 14. By means of such an arrangement, precise positioning of the cell becomes unnecessary. As another alternative, the image of the mask may be focused on the cell.

The advantages to be obtained from the use of this invention will be apparent to those skilled in the spectrometer and instrumentation arts. It is to be understood that various modifications may be made without departing from the spirit and scope of this invention. The foregoing description is illustrative only and the invention is limited only by the scope of the following claims.

I claim:
1. Spectrophotometric apparatus which comprises source means generating radiant energy; optical means forming a sample beam and a reference beam from said radiant energy; means for detecting and measuring the relative intensities of said sample and reference beams; and means for holding a radiation-absorbing sample in only one portion of said sample beam to attenuate said portion, while leaving the remaining other portion of said sample beam substantially unaffected, so that said detecting means receives sample beam radiation even when said sample totally absorbs said one portion of said sample beam.

2. The apparatus of claim 1 wherein said measuring means comprises means for variably attenuating said reference beam for achieving a null condition between said sample and reference beams.

References Cited by the Examiner
UNITED STATES PATENTS

| | | | |
|---|---|---|---|
| 1,695,031 | 12/28 | Schmick | 88—14 |
| 2,621,298 | 12/52 | Wild et al. | 250—43.5 |
| 2,878,388 | 3/59 | Bergson | 250—43.5 |
| 2,970,512 | 2/61 | Waters et al. | |

RALPH G. NILSON, *Primary Examiner.*